(12) United States Patent
Ala-Luukko

(10) Patent No.: US 9,730,035 B2
(45) Date of Patent: *Aug. 8, 2017

(54) SYSTEM AND METHOD FOR BLOCKING THE USE OF A SERVICE IN A TELECOMMUNICATION SYSTEM

(71) Applicant: Intellectual Ventures I LLC, Wilmington (DE)

(72) Inventor: Sami Ala-Luukko, Helsinki (FI)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/177,869

(22) Filed: Jun. 9, 2016

(65) Prior Publication Data

US 2016/0286369 A1   Sep. 29, 2016

Related U.S. Application Data

(60) Division of application No. 14/445,266, filed on Jul. 29, 2014, now Pat. No. 9,369,590, which is a division
(Continued)

(30) Foreign Application Priority Data

Jul. 15, 2005   (FI) ..................... 2000-0852

(51) Int. Cl.
*H04W 40/00*   (2009.01)
*H04W 4/14*   (2009.01)
(Continued)

(52) U.S. Cl.
CPC ............. *H04W 4/14* (2013.01); *H04L 12/585* (2013.01); *H04L 12/5895* (2013.01);
(Continued)

(58) Field of Classification Search
CPC ......... H04W 4/14; H04W 4/16; H04W 8/245; H04M 3/54
(Continued)

(56) References Cited

U.S. PATENT DOCUMENTS 5,594,731 A   1/1997 Reissner
5,654,959 A   8/1997 Baker et al.
(Continued)

FOREIGN PATENT DOCUMENTS

| FI | 20000852 | 4/2000 |
|---|---|---|
| WO | WO-99/27726 | 6/1999 |
| WO | WO-00/42790 | 7/2000 |

OTHER PUBLICATIONS

AT & T'S Third Supplemental Preliminary Invalidity Contentions from C.A. No. 12-193-LPS, C.A. No. 13-1361-LPS May 8, 2015.
(Continued)

*Primary Examiner* — Danh Le

(57) ABSTRACT

A method and system for controlling the use of a short message service in a telecommunication system that includes a telecommunication network, a terminal device by which a subscriber is connected to the network, a mobile services switching center connected to the network, a gateway connected to the network, a short message service center connected to the gateway, and a database (DB) connected to or associated with the gateway. A short message sent by an originating subscriber is checked as to whether the short message is among those deemed non-allowed. Forwardable short messages are directed to the gateway, from which the database is queried to determine whether the originating subscriber is permitted the short message to the intended recipient or, alternatively, whether the message should been blocked based on predetermined criteria.

18 Claims, 3 Drawing Sheets

Related U.S. Application Data of application No. 13/282,982, filed on Oct. 27, 2011, now Pat. No. 8,805,350, which is a division of application No. 11/511,550, filed on Aug. 28, 2006, now Pat. No. 8,078,200, which is a continuation of application No. 11/182,124, filed on Jul. 15, 2005, now Pat. No. 7,450,957, which is a continuation of application No. 10/267,164, filed on Oct. 9, 2002, now Pat. No. 6,920,332, which is a continuation of application No. PCT/FI01/00354, filed on Apr. 10, 2001.

(51) Int. Cl.

| | | |
|---|---|---|
| *H04L 12/58* | (2006.01) | |
| *H04W 4/12* | (2009.01) | |
| *H04W 8/18* | (2009.01) | |
| *H04M 15/00* | (2006.01) | |
| *H04M 3/436* | (2006.01) | |
| *H04W 8/22* | (2009.01) | |
| *H04W 12/08* | (2009.01) | |
| *H04W 48/02* | (2009.01) | |
| *H04W 88/18* | (2009.01) | |

(52) U.S. Cl.
CPC .............. *H04L 51/12* (2013.01); *H04L 51/38* (2013.01); *H04M 3/436* (2013.01); *H04M 15/61* (2013.01); *H04M 15/88* (2013.01); *H04W 4/12* (2013.01); *H04W 8/18* (2013.01); *H04W 8/22* (2013.01); *H04W 12/08* (2013.01); *H04W 48/02* (2013.01); *H04W 88/184* (2013.01)

(58) Field of Classification Search
USPC .................................. 455/466, 445, 417, 418
See application file for complete search history.

(56) References Cited

U.S. PATENT DOCUMENTS

| | | | |
|---|---|---|---|
| 5,768,509 A | 6/1998 | Gunluk | |
| 5,867,558 A * | 2/1999 | Swanson | H04M 3/2254 379/12 |
| 5,878,338 A | 3/1999 | Alperovich et al. | |
| 5,903,726 A | 5/1999 | Donovan et al. | |
| 5,915,222 A | 6/1999 | Olsson et al. | |
| 5,937,355 A | 8/1999 | Joong et al. | |
| 5,946,630 A | 8/1999 | Willars et al. | |
| 6,085,100 A | 7/2000 | Tarnanen | |
| 6,101,393 A * | 8/2000 | Alperovich | H04M 3/533 370/278 |
| 6,263,212 B1 | 7/2001 | Ross et al. | |
| 6,289,223 B1 | 9/2001 | Mukherjee et al. | |
| 6,292,669 B1 | 9/2001 | Meuronen et al. | |
| 6,397,054 B1 | 5/2002 | Hoirup et al. | |
| 6,459,904 B1 | 10/2002 | Lorello et al. | |
| 6,473,622 B1 | 10/2002 | Meuronen | |
| 6,519,468 B1 | 2/2003 | Donovan et al. | |
| 6,543,686 B1 * | 4/2003 | Ritter | G06Q 20/127 235/380 |
| 6,584,323 B1 * | 6/2003 | Son | H04M 1/72552 455/412.1 |
| 6,633,764 B1 | 10/2003 | Garcia | |
| 6,678,827 B1 | 1/2004 | Rothermel et al. | |
| 6,771,949 B1 | 8/2004 | Corliss | |
| 6,771,974 B1 * | 8/2004 | Sim | H04M 1/72552 340/7.21 |
| 7,079,524 B2 * | 7/2006 | Bantukul | H04W 40/34 370/349 |
| 7,257,122 B1 | 8/2007 | Keturi | |
| 2002/0010705 A1 | 1/2002 | Park et al. | |
| 2002/0054674 A1 * | 5/2002 | Chang | H04M 3/436 379/207.02 |
| 2002/0198877 A1 | 12/2002 | Wolff et al. | |
| 2003/0050042 A1 | 3/2003 | Olah | |
| 2003/0147518 A1 | 8/2003 | Albal et al. | |
| 2004/0122730 A1 | 6/2004 | Tucciarone et al. | |
| 2007/0161387 A1 | 7/2007 | Roberts | |
| 2009/0157798 A1 | 6/2009 | Laumen et al. | |

OTHER PUBLICATIONS

ATTs 2nd Supplemental Invalidity Contentions from C.A. No. 12-193-LPS, C.A. No. 13-1361-LPS dated May 4, 2015.
Defendants' Second Supplemental Invalidity Contentions for U.S. Pat. No. 7,450,957, Appendix K-1, *Intellectual Ventures I, LLC v. Nextel Operations, Inc. et al* 13-cv-1634.
Defendants' Second Supplemental Invalidity Contentions for U.S. Pat. No. 7,450,957, Appendix K-5, *Intellectual Ventures I, LLC v. Nextel Operations, Inc. et al* 13-cv-1634.
Defendants' Second Supplemental Invalidity Contentions for U.S. Pat. No. 8,078,200, Appendix M-1, *Intellectual Ventures I, LLC v. Nextel Operations, Inc. et al* 13-cv-1634.
Defendants' Second Supplemental Invalidity Contentions for U.S. Pat. No. 8,078,200, Appendix M-7, *Intellectual Ventures I, LLC v. Nextel Operations, Inc. et al* 13-cv-1634.
International Search Report received for PCT/FI01/00354 completed Jul. 27, 2001.
Non-Final Office Action on U.S. Appl. No. 13/282,982, mailed Oct. 30, 2013.
Non-Final Office Action on U.S. Appl. No. 14/445,266 mailed Oct. 1, 2015.
Non-final Office Action received for U.S. Appl. No. 11/511,550 dated Aug. 31, 2010.
Non-final Office Action received for U.S. Appl. No. 11/511,550 dated Feb. 15, 2011.
Non-final Office Action received for U.S. Appl. No. 11/511,550 dated Mar. 12, 2010.
Notice of Allowance on U.S. Appl. No. 13/282,982, mailed Apr. 10, 2014.
Notice of Allowance on U.S. Appl. No. 14/445,266 mailed Feb. 18, 2016.
Notice of Allowance received for U.S. Appl. No. 11/511,550 dated Oct. 24, 2011.
Restriction Requirement received for U.S. Appl. No. 11/511,550 dated Apr. 20, 2009.
Restriction Requirement received for U.S. Appl. No. 11/511,550 dated Aug. 4, 2009.
Restriction Requirement received for U.S. Appl. No. 11/511,550 dated Nov. 20, 2009.
Sprint's Second Supplemental Invalidity Contentins for U.S. Pat. No. 7,450,957, Appendix K-10, *Intellectual Ventures I, LLC v. Nextel Operations, Inc. et al* 13-cv-1634, May 11, 2015.
Sprint's Second Supplemental Invalidity Contentins for U.S. Pat. No. 7,450,957, Appendix K-9, *Intellectual Ventures I, LLC v. Nextel Operations, Inc. et al* 13-cv-1634, May 11, 2015.
Sprint's Second Supplemental Invalidity Contentions for U.S. Pat. No. 7,450,957, Appendix K-12, *Intellectual Ventures I, LLC v. Nextel Operations, Inc. et al* 13-cv-1634, May 11, 2015.
Sprint's Second Supplemental Invalidity Contentions for U.S. Pat. No. 7,450,957, Appendix K-1, *Intellectual Ventures I, LLC v. Nextel Operations, Inc. et al* 13-cv-1634.
Sprint's Second Supplemental Invalidity Contentions for U.S. Pat. No. 7,450,957, Appendix K-11, *Intellectual Ventures I, LLC v. Nextel Operations, Inc. et al* 13-cv-1634, May 11, 2015.
Sprint's Second Supplemental Invalidity Contentions for U.S. Pat. No. 7,450,957, *Intellectual Ventures I, LLC v. Nextel Operations, Inc. et al* 13-cv-1634, May 11, 2015.
Sprint's Second Supplemental Invalidity Contentions for U.S. Pat. No. 8,078,200, Appendix M-1, *Intellectual Ventures I, LLC v. Nextel Operations, Inc. et al* 13-cv-1634, May 11, 2015.
Sprint's Second Supplemental Invalidity Contentions for U.S. Pat. No. 8,078,200, Appendix M-11, *Intellectual Ventures I, LLC v. Nextel Operations, Inc. et al* 13-cv-1634, May 11, 2015.
Sprint's Second Supplemental Invalidity Contentions for U.S. Pat. No. 8,078,200, Appendix M-12, *Intellectual Ventures I, LLC v.*

(56) References Cited

OTHER PUBLICATIONS

*Nextel Operations, Inc. et al* 13-cv-1634, May 11, 2015.
Sprint's Second Supplemental Invalidity Contentions for U.S. Pat. No. 8,078,200, Appendix M-13, *Intellectual Ventures I, LLC* v. *Nextel Operations, Inc. et al* 13-cv-1634, May 11, 2015.
Sprint's Second Supplemental Invalidity Contentions for U.S. Pat. No. 8,078,200, Appendix M-14, *Intellectual Ventures I, LLC* v. *Nextel Operations, Inc. et al* 13-cv-1634, May 11, 2015.
Sprint's Second Supplemental Invalidity Contentions for U.S. Pat. No. 8,078,200, *Intellectual Ventures I, LLC* v. *Nextel Operations, Inc. et al* 13-cv-1634, May 11, 2015.

\* cited by examiner

SYSTEM AND METHOD FOR BLOCKING THE USE OF A SERVICE IN A TELECOMMUNICATION SYSTEM

CROSS-REFERENCE TO RELATED PATENT APPLICATIONS

This application is a Divisional of U.S. application Ser. No. 14/445,266, filed Jul. 29, 2014, which is a Divisional of U.S. application Ser. No. 13/282,982, filed Oct. 27, 2011 (now U.S. Pat. No. 8,805,350), which is a Divisional of U.S. application Ser. No. 11/511,550, filed Aug. 28, 2006 (now U.S. Pat. No. 8,078,200), which is a Continuation of U.S. application Ser. No. 11/182,124, filed Jul. 15, 2005 (now U.S. Pat. No. 7,450,957), which is a Continuation of U.S. application Ser. No. 10/267,164 filed Oct. 9, 2002 (now U.S. Pat. No. 6,920,332), which is a Continuation of International Application PCT/FI01/00354, filed Apr. 10, 2001, which claims priority to Finland Priority Application 2000-0852, filed Apr. 10, 2000, all of which are incorporated herein by reference in their entirety.

BACKGROUND OF THE INVENTION

1. Field of the Invention

The present invention relates to telecommunication systems and, in particular, is directed to a method and system for controlling subscriber access to services accessed through a telecommunication system using short messages.

2. Description of Related Art

Mobile communication networks, such as digital GSM (Global System for Mobile Communications) networks, have become extremely popular throughout a large part of the world. The primary advantage presented by mobile communication networks, as compared to traditional fixed telephone networks, is the air or wireless interface provided between the subscriber's terminal device and the physical wired network, which wireless interface enables wide-ranging subscriber mobility.

Since their introduction, digital mobile networks have provided to their subscribers the ability to use and access a variety of services including the so-called short message service or SMS. In the short message service a subscriber or user of a mobile station has the ability to send a short text message of up to 160 characters from the user's mobile station to, by way of example, another user of a respective mobile station who has a terminal device capable of receiving the short message. The short message is transmitted from the mobile station via a wireless interface separate from or outside of the speech-transmitting time slots, there enabling a user to receive short messages at the same time that the user is already engaged in an ongoing voice call with a different party.

To date, short messages have become very popular among telecommunication system subscribers, and system operators have developed and implemented an unusually large number of short messaging services and other services that are accessible or usable via short messages for additional charges. This has in practice meant that a certain portion of the available numerical address space on the system has been allocated for these services. Technically this means that separate analyses are carried out in the short message service center for these various allocated numbers; based on these analyses, short messages sent by subscribers to those numbers are further forwarded or transmitted to the appropriate locations, such as service providers or application providers.

The short message service has typically either been activated for a particular subscriber or it has not been activated for that subscriber. As currently implemented the systems for transmission of short messages do not permit the blocking of short message service messages or requests based on the B-subscriber (i.e. the intended recipient) number or based on specific or otherwise predetermined or specified search words or terms that may be contained in the short message text. This has limited the versatility of short messaging services and has prevented service providers and system operators from providing or fully implementing some services that subscribers might otherwise use or access via short messages.

OBJECTS AND SUMMARY OF THE INVENTION

It is accordingly the desideratum of the present invention to eliminate, or at least significantly alleviate, the drawbacks and deficiencies of prior art systems and designs, as for example those hereinabove discussed.

It is a particular object of the invention to provide a method and system that permits the selective blocking of transmission of short messages that are addressed to a particular numerical space or intended destination address, or which contain a specific search word and/or specified textual information content.

The invention has evolved from a recognition that the merchandising of short messages for additional charges is likely to initiate a desire among some system operators and controllers of telephone traffic to provide for its customers selective blocking of the functionality or availability of, or access to, certain services or the like that are accessed or used or merchandised via short messages. Just as access to specified telephone numbers may if required be selectively blocked, so too can the blocking of certain short messages be implemented in accordance with the present invention. The primary objective of the invention is accordingly to enable and implement such selective blocking of short messages.

The present invention is effective to control the use of short message services as available functionality of the network in such a way to implement SMS barring in conjunction with a subscriber-specific database that is installed in or attached to the network. The database contains information on whether blocking of SMS message transmission has been defined or implemented for a particular subscriber. If so, then the SMS barring must be able to determine, based on information included in the database and the intended destination number of the short message and/or, optionally, on the inclusion (or absence) of a predetermined search word or phrase in the short message text, whether transmission of that short message should be permitted for that subscriber. If it is determined that the subscriber is not entitled or authorized to use the service to which the short message is directed, or to send a short message to the intended destination number, then the short message is not transmitted further and is thereby blocked from delivery to the intended destination.

The invention specifically relates to a method and system for controlling a short message service in a mobile communication system that includes a telecommunication network, a terminal device by which a short message-originating subscriber is connected to the telecommunication network, a mobile services switching center connected to the telecommunication network, a gateway that is connected to the telecommunication network and which provides operative functionality associated with the transmission of traffic, a short message service center connected to the gateway, and a database that is connected to the gateway and in which subscriber information may be saved and stored. The inventive system further includes a first and a second signal interface in the environment of the gateway. The gateway operatively provides the ability to enable communication between the various network components via the first and second signal interfaces.

In the inventive method, a short message from the terminal device of the originating subscriber is created and then transmitted from the terminal device to the telecommunication network. The short message is routed to the short message service center in which the short message is checked or screened, i.e. as to whether they are among those not authorized or permitted, as they arrive. By way of illustration, this initial checking or screening may determine whether the destination address of the short message lies within a predetermined address space for which short messages addressed to that address space are not necessarily permitted to proceed (so-called non-allowed messages)—as for example where the destination address could be for a service that requires special access rights, or where additional charges might be applicable for the service. From the short message service center, those short messages that have been identified as forwardable from the short message service center are sent to the gateway. The message is then checked or screened against a database in or accessible to the gateway to determine whether the subscriber is in fact permitted to send that short message. In the event that it is determined that transmission of the short message should be blocked, then further transmission to the intended recipient is prevented and the originating subscriber is informed that the short message has in fact been blocked. This notification may be transmitted to the originating subscriber's terminal device using, by way of example, a short message, USSD (Unstructured Supplementary Service Data), or any other suitable mechanism.

In an embodiment of the invention, the latter checking of the short message is based on the destination number dialed or entered by the subscriber attempting to send the short message. The short message may also be checked based on its text content.

The blocking definitions that are used in the checking of short messages may be attached to the blocking information that is located in the telecommunication system home location register, as defined by the system operator.

The present invention additionally provides a system for controlling subscriber use of a short message service in a telecommunication system that includes a telecommunication network, a terminal device by which the subscriber is connected to the telecommunication network, a mobile services switching center that is connected to the telecommunication network, a gateway connected to the telecommunication network and which operatively provides functionality associated with the transmission of traffic, a short message service center that is connected to the gateway, and a database connected to the gateway and in which subscriber information and checking or screening or blocking definitions may be stored.

In the inventive system, a checking block or function is employed to check, in the short message service center using a first checking condition, whether the short message is among non-allowed short messages. Non-allowed messages may be by way of example be those for which the intended destination address or number is in or among a predetermined numerical address space of the system or network. If it is determined that the message is among such non-allowed short messages, then a database block is employed to further check, based on the stored blocking definitions, whether the subscriber is permitted or entitled to send such the short message.

The aforementioned checking block is also operable to check the short message based on a second checking condition utilizing the intended destination number of the short message as dialed or entered by the originating subscriber, and to further check the short message based on a third checking condition directed to the text content that is contained in the short message that has been sent by the originating subscriber.

In an embodiment of the inventive system, the database is located in or attached to one of the mobile services switching center of the A-subscriber (i.e. the message-sending or originating subscriber), the gateway, and the short message switching center, and these various components of the mobile communication system operatively carry out the checking of the short message using the blocking definitions stored in the database. The database may be external (i.e. attached to one of these system components) or internal (i.e. integral or a part of one of these system components.

In an embodiment of the invention, the database is based on and utilized integrally with the functionality of the interface between the home location register and the visitor location register. In such implementations, from the viewpoint of the system operator of the home network, the home location register functions as the master database. As a consequence, when a mobile station moves into the coverage area or region of a particular mobile services switching center, information relating to the blocking of short message transmissions for that mobile station is copied from the database to the visitor location register in accordance with normal operating procedures of the GSM mobile communication system.

Also in an embodiment of the invention, the gateway includes or is provided with a signaling block that is operable to send the signals needed to implement the blocking of short message transmissions between the first and second interfaces.

Additionally in an embodiment of the inventive system, the system includes a saving block operable for attaching short message blocking definitions to the blocking information stored or maintained in the home location register (HLR) as defined by the system operator.

As compared to prior art systems, operations and methods, the present invention advantageously permits ready control of short message service access rights based on the intended recipient subscriber number and/or a search of short message text or content as a result of the shared use of modified databases and network elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar or corresponding elements throughout the various Figures.

DETAILED DESCRIPTION OF THE PREFERRED EMBODIMENTS

Figure 1:
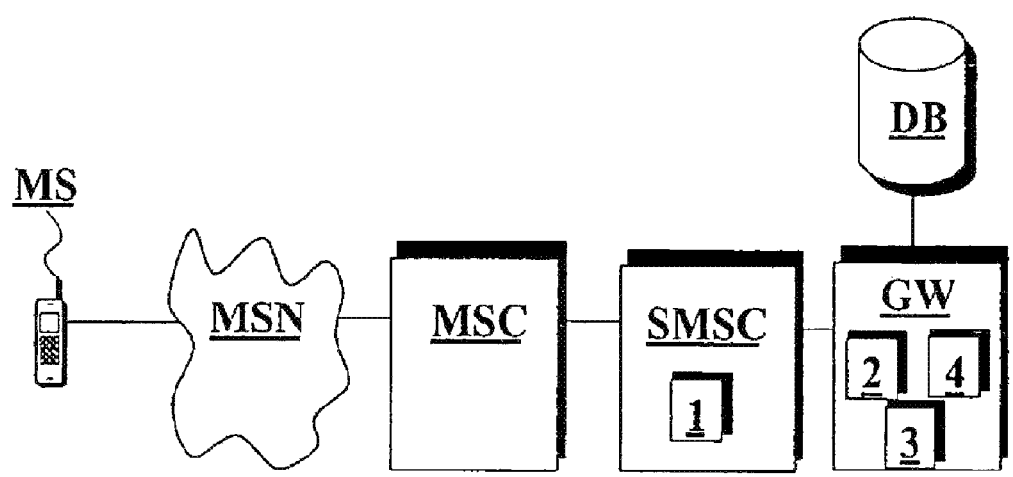
FIG. 1 is a block diagram of a system in accordance with the present invention.

The system shown in FIG. 1 includes a terminal device MS and a telecommunication network MSN to which the terminal device is connected, as for example by way of a wireless communication link or radio interface. In this implementation, by way of preferred example, the telecommunication network MSN is a mobile communication network, and the terminal device MS is a mobile station. The system also includes a mobile services switching center MSC, a short message service center SMSC, a gateway GW, and a database DB. The mobile services switching center MSC is connected to the mobile communication network MSN and to the short message service center SMSC. The gateway GW is connected to the short message service center SMSC, and the database DB is connected to the gateway GW.

Provided in short message service center SMSC is a checking block 1 that is operable to determine, in the short message service center based on a first checking condition, whether a short message is among predetermined non-allowed short messages. The first checking condition may, by way of preferred example, determine whether the intended destination number or address of the short message is among or within a predetermined numerical address space or range. The checking block 1 is also operable to check a short message based on a second checking condition utilizing the specific destination number to which the short message is to be delivered as dialed or entered by the originating subscriber that has sent the short message. This second checking condition may, for example, be employed to determine whether the short message is directed to a destination number of a service for which an additional charge is applicable or levied. The checking block 1 is sill further operable to check a short message using a third checking condition based on the text content contained in the short message as prepared or sent by the originating subscriber. Thus, separate and apart from checks based on the intended destination subscriber address or number for the short message, the originating user may have included in the message text a word or phrase for which a search can be carried out, as for example the word "balance". Checking of the short message for the presence of predetermined search words or phrases can accordingly be used to identify messages seeking to utilize services that are billed at different charges and that have therefore been grouped in different blocking classes.

The gateway GW may by way of illustration be implemented by a server computer containing or running software that supports the GSM system and the necessary signaling protocols. Among other things, gateway GW typically contains or has access to databases for the storage of subscriber-specific information as well as signaling components such as SS7 (Signaling System number 7) for signaling functionality, to which the various signaling interfaces required for communications may be appropriately tailored or matched.

Gateway GW also includes the software needed to carry out its various conventional system operations, such as service creation, execution and management of the environment, and descriptions of services. Gateway GW further includes or implements signaling protocols such as INAP (Intelligent Network Application Part, i.e. the protocol used in inter-network application performance), MAP (Mobile Application Part, which is used for GSM network signaling), TCAP (Transaction Capabilities Application Part), TCP/IP (Transmission Control Protocol/Internet Protocol, i.e. the protocol used in the control of data transfers and Internet transmissions), and SMTP (Short Message Transfer Protocol, i.e. the protocol used in the transmission of short messages). In the system of FIG. 1 gateway GW is connected to short message service center SMSC and to database DB. Gateway GW receives short messages from the short message service center SMSC and analyzes the received short messages.

From the viewpoint of the system operator, the transmission from the originating subscriber contains significant identifying information that can be compared with the information contained in the database of (or attached to) gateway GW. Following such identification, the database block 2 of gateway GW is utilized to check in database DB, based on the blocking definitions, whether the message-originating subscriber is entitled or permitted to send the short message. The invention provides a signaling block 3 in gateway GW for sending the signals needed for blocking of short message transmissions between the first and second signal interfaces, in accordance with the appropriate aforementioned protocols.

The database DB can also, in accordance with the invention, define protocols on the basis of which the sending of a short message to the intended recipient (i.e. the B-subscriber) is blocked. The intended B-subscriber recipient of the short message may also him- or herself define blocking functionality for one or more identified A-subscriber senders, based on which the transmission of short messages originating from the identified A-subscribers to the mobile station of the B-subscriber will be blocked.

The database DB may be external or internal. The external database may for example be a home location register HLR, in which case the database DB is based on the functionality of the interface between the home location register HLR and the visitor location register VLR so that, from the viewpoint of the home network operator, the home location register HLR functions as the master database. In such implementations the saving block 4 of gateway GW functions to attach the short message blocking definitions to the blocking information located in the home location register HLR, as defined by the system operator. The database DB may be located in (or attached to) the mobile services switching center MSC, in gateway GW, or in the short message service center SMSC.

Figure 2:
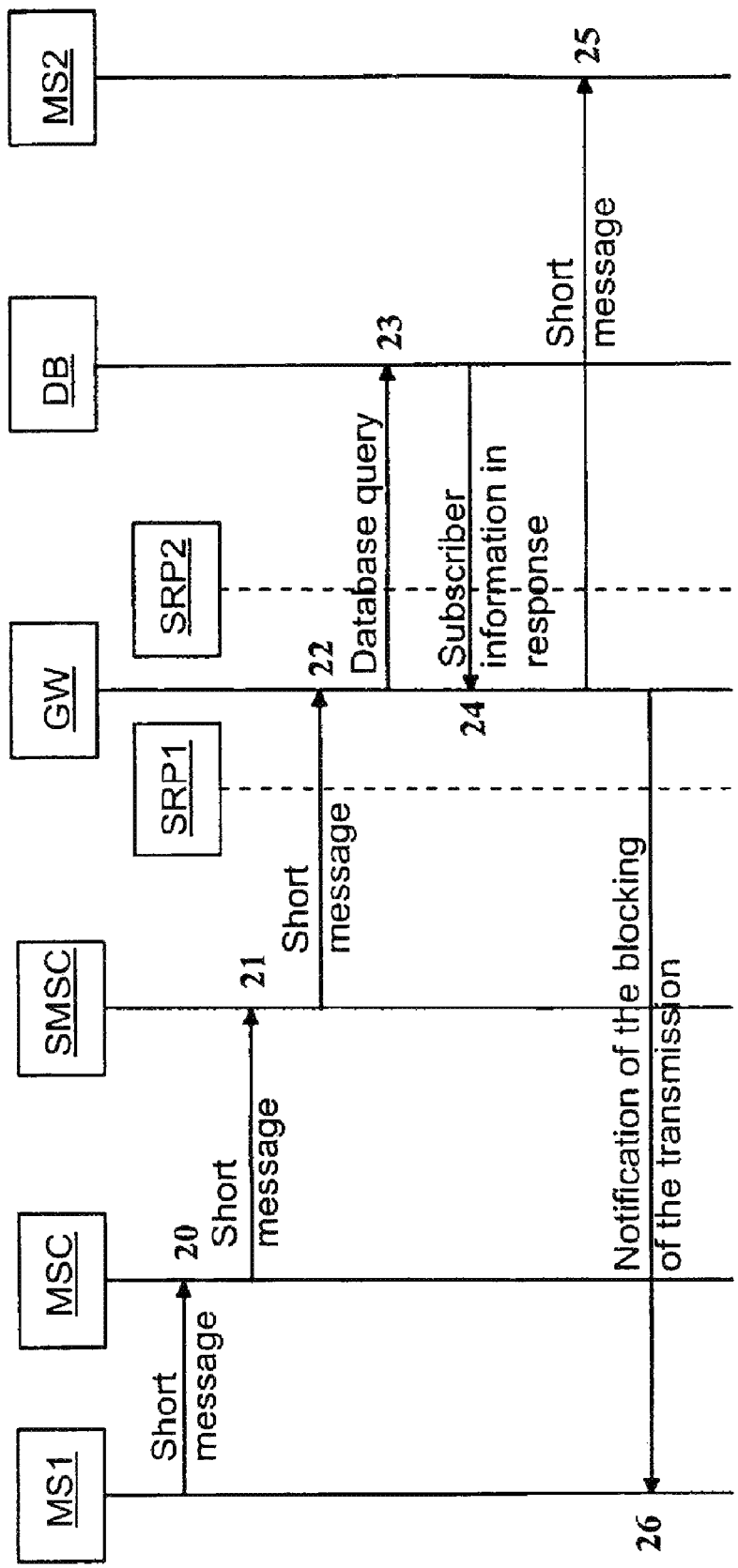
FIG. 2 is a flow chart of an implementation of the present invention.

FIG. 2 is a flow chart that illustrates the operations and functioning of an advantageous implementation of the present invention. A short message is initially sent from the terminal device MS1 of the originating subscriber to the mobile services switching center MSC (arrow 20). The short message is then transmitted from mobile service switching center MSC to the short message service center SMSC (arrow 21). The short message service center receives the short message, analyzes it and sends to the gateway GW only those short messages that, based on the analysis, are among those short messages to be further transmitted from the short message service center (arrow 22).

Gateway GW receives the short message and checks, through a database query in database DB, whether the originating subscriber is entitled or permitted to send the short message (arrow 23). At this point, the signaling block of gateway GW attends to providing or assuring compatibility of traffic between the first and second signal interfaces SRP1, SRP2. The first signal interface SRP1 is the interface between gateway GW and short message service center SMSC, and the second signal interface SRP2 is the interface between gateway GW and database DB.

The database query by gateway GW may for example be carried out using a structured query language (SQL) protocol. In response to that query gateway GW obtains the originating subscriber information that indicates whether the subscriber is entitled to send a short message or whether the transmission should be blocked (arrow 24). If blocking of short message transmission is not indicated for the subscriber, then the transmission is permitted to proceed (arrow 25). If on the other hand the transmission is to be blocked, then notification of the blocking of the transmission is sent from gateway GW to mobile services switching center MSC (arrow 26). This notification may fore example be sent by way of a short message, USSD (Unstructured Supplementary Service Data), or by any other suitable arrangement or mechanism.

Figure 3:
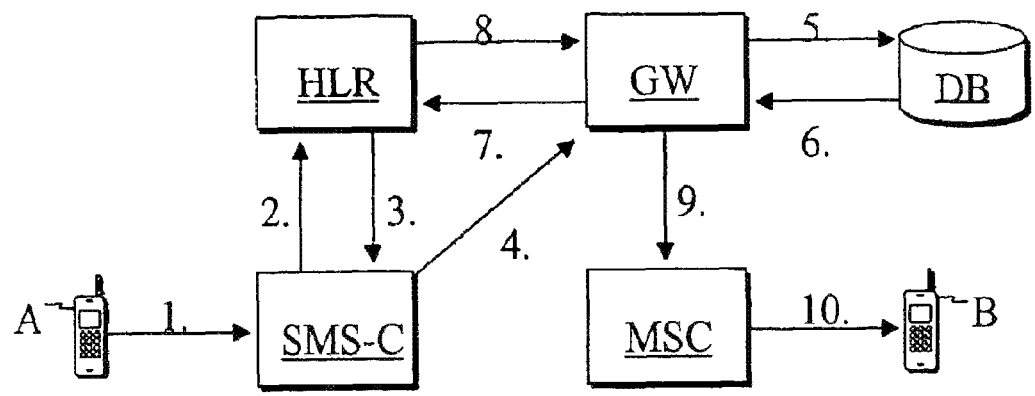
FIG. 3 is a signaling diagram illustrating functionality provided by an implementation of the invention.

The signaling diagram of FIG. 3 depicts another implementation of the invention illustrating additional functionality. The A-subscriber sends an MO (Mobile Originated) short message to the intended recipient B-subscriber. The short message is transmitted to the short message service center SMS-C (arrow 1). The short message service center SMS-C retrieves the routing information of the B-subscriber from the home location register HLR, as for example via an SRI (Send Routing Information) for SMS message (arrow 2). In response to that query, home location register HLR normally returns the address of the mobile services switching center for the B-subscriber. However, in accordance with this implementation of the invention it is determined from the B-subscriber information that SMS blocking service has been activated in the home location register HLR for the B-subscriber. As a consequence, the home location register HLR returns to the short message service center SMS-C not the address of the mobile services switching center but, instead, the address of the gateway GW (arrow 3). The short message sent by the A-subscriber is in this manner directed from the short message service center SMS-C to the gateway GW by a Forward SM MT (Mobile Terminated) message (arrow 4). Having received the short message from the short message service center SMS-C, gateway GW carries out a search in database DB of the stored B-subscriber information (arrow 5), and database DB returns to gateway GW a response indicating whether the A-subscriber information could be found in a blocking list associated with the B-subscriber in the database (arrow 6). If the A-subscriber information was found in the B-subscriber blocking list, then the short message is blocked and thereby not transmitted to the B-subscriber.

If on the other hand the A-subscriber information was not found in the B-subscriber blocking list, then gateway GW sends an SRI for SM message to gateway GW (arrow 7). The SRI for SM message provides to gateway GW the routing information for the B-subscriber from the home location register HLR (arrow 8). An SRI (Send Routing Info) message may be sent from gateway GW to home location register HLF in place of an SRI for SM message, in which case the home location register recognizes that the message has come from gateway GW and returns the routing information for the B-subscriber to gateway GW (arrow 8). Where, however, the gateway sends an SRI for SM message, the home location register HLR first determines whether it should return the address of the gateway GW or the address of the proper mobile services switching center; that determination may for example be based on the state of a single bit in the SRI for SM message. Gateway GW then sends a Forward SM message to the mobile services switching center MSC (arrow 9), and mobile services switching center MSC further transmits the short message to the B-subscriber (arrow 10).

When a client or subscriber requests or orders a blocking service, the system operator creates for the client an information field in database DB. The client may also directly, i.e. without involving the system operator, add or eliminate specific A-subscriber telephone numbers from the blocking service, as for example by way of a World Wide Web or browser-based user interface set up for the client, to define those A-subscribers from which the B-subscriber does not wish to receive short messages. The operations of the gateway GW may also be implemented so as to provide a variety of functions associated with short messages; for example, the blocking service may send a notification of a blocked short message to the sender or originator of the short message, may store a message for later or delayed delivery, etc. The short message blocking service may be implemented with respect to normal subscriber numbers as well as service-access numbers.

Figure 4:
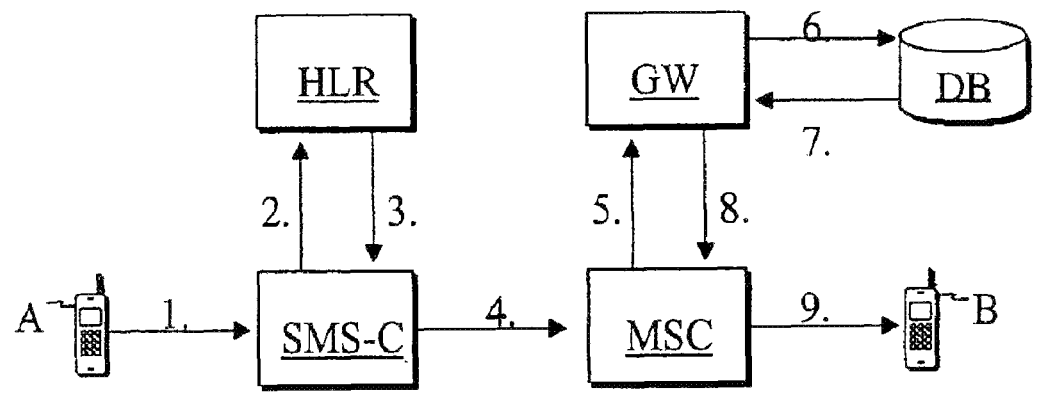
FIG. 4 is a signaling diagram illustrating functionality provided by another implementation of the invention.

Still further functionality provided by the present invention is illustrated in the signaling diagram of FIG. 4. An A-subscriber sends an MO (Mobile Originated) short message addressed to the number of a B-subscriber. The short message is transmitted to the short message service center SMS-C (arrow 1). Short message service center SMS-C retrieves the routing information for the B-subscriber from the home location register HLR, as for example by an SRI for SMS message (arrow 2). In response to the query from the short message service center, the home location register HLR returns the address of the mobile services switching center MSC of the B-subscriber (arrow 3). The short message is then transmitted, in accordance with the query response, from the short message service center SMS-C to the identified mobile services switching center MSC (arrow 4). Based on the B-subscriber user information, the mobile services switching center MSC is informed as to whether any special measures are to be taken for short message traffic addressed to the B-subscriber. The B-subscriber user information is retrieved from the home location register HLR when the B-subscriber enters the coverage area of the mobile services switching center MSC. The B-subscriber user information is preferably saved in the visitor location register VLR (Visitor Location Register) located in or attached to or otherwise associated with the mobile services switching center MSC. In this illustrative implementation, the SMS blocking service is indicated in the B-subscriber user information as having been activated and, as a consequence, the short message is further directed to the gateway GW (arrow 5).

Gateway GW carries out or effects a search in the database DB based on the B-subscriber information (arrow 6), and database DB returns to gateway GW an indication of whether the A-subscriber information was present in the stored blocking list associated with the B-subscriber (arrow 6). If the A-subscriber information was found in the blocking list, then the short message is blocked and is therefore not transmitted to the B-subscriber. If on the other hand the A-subscriber information was not located in the blocking list, then gateway GW forwards or returns the short message to the mobile services switching center MSC of the B-subscriber. Mobile services switching center MSC recognizes that the short message came from gateway GW and further transmits the short message to the B-subscriber (arrow 9).

The invention thus enables system subscribers to advantageously utilize its functionality to implement a virtually unlimited number of blocking scenarios. For example, in the embodiments of either FIG. 3 or FIG. 4, a subscriber or client A may wish to not receive short messages from her ex-boyfriend. The client defines in her blocking service that short messages coming from the telephone number of her ex-boyfriend are not to be transmitted to her mobile station, and may herself set the duration of the service block.

Similarly, in either of the embodiments of FIG. 3 or 4, a client B may not wish to receive short messages from the client's work colleagues during the client's vacation. The client may accordingly define in the blocking service all those message-originating telephone numbers for which the client wishes to implement short message blocking. In this manner the client can avoid receipt of work-related short messages during the vacation. The blocked short messages may instead be stored by the service, and the senders of the short messages can be notified of the fact that the short messages have not been delivered to the intended recipient.

As should be apparent, the invention is not intended to be restricted merely to those implementations described herein, as numerous variations are possible and should be deemed to be within the scope and contemplation of the invention.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any-disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system comprising:
 a second node configured to:
  receive a short message service (SMS) message from a first node, wherein the SMS message has been screened at the first node prior to receipt at the second node;
  determine that the SMS message is allowed to be forwarded; and
  forward the SMS message to a third node different from the second node based on the determination that the SMS message is allowed to be forwarded,
 wherein the first node is further configured to screen the SMS message based on determining that monetary charges are associated with a destination address of the SMS message.

2. The system of claim 1, wherein the second node is configured to determine if the SMS message is allowed to be forwarded by accessing a database to determine blocking information.

3. The system of claim 1, wherein the first node is configured to determine if the SMS message is screened by analyzing message text within the SMS message.

4. The system of claim 1, wherein the second node is configured to determine if the SMS message is allowed to be forwarded by determining if the originating subscriber associated with the SMS message is entitled to send the SMS message.

5. The system of claim 1, wherein the first node is further configured to screen the SMS message based on a predetermined word in a message text of the SMS short message.

6. The system of claim 1, wherein the second node is a gateway.

7. The system of claim 1, wherein the second node is further configured to block the SMS message from being forwarding to the third node after determining that a blocking condition is satisfied by comparing the short message to a predetermined criterion.

8. The system of claim 7, wherein the predetermined criterion comprises an origination address of the SMS message.

9. The system of claim 1, wherein determining that the SMS message is allowed to be forwarded to the third node comprises checking on monetary charges associated with the second node.

10. A method comprising:
 receiving a short message service (SMS) message from a first node at a second node, wherein the SMS message has been screened at the first node prior to receipt at the second node;
 determine, at the second node, that the SMS message is allowed to be forwarded; and
 forward the SMS message from the second node to a third node different from the second node based on the determination that the SMS message is allowed to be forwarded,
 wherein the first node is further configured to screen the SMS message based on determining that monetary charges are associated with a destination address of the SMS message.

11. The method of claim 10, wherein the second node is configured to determine if the SMS message is allowed to be forwarded by accessing a database to determine blocking information.

12. The method of claim 10, wherein the first node is configured to determine if the SMS message is screened by analyzing message text within the SMS message.

13. The method of claim 10, wherein the second node is configured to determine if the SMS message is allowed to be forwarded by determining if the originating subscriber associated with the SMS message is entitled to send the SMS message.

14. The method of claim 10, wherein the first node is further configured to screen the SMS message based on a predetermined word in a message text of the SMS short message.

15. A non-transitory computer readable medium having instructions stored thereon, the instructions comprising:
 instructions for receiving a short message service (SMS) message from a first node at a second node, wherein the SMS message has been screened at the first node prior to receipt at the second node;
 instructions for determining, at the second node, that the SMS message is allowed to be forwarded; and
 instructions for forwarding the SMS message from the second node to a third node different from the second node based on the determination that the SMS message is allowed to be forwarded, wherein the first node is further configured to screen the SMS message based on determining that monetary charges are associated with a destination address of the SMS message.

16. The non-transitory computer readable medium of claim 15, wherein the first node is configured to determine if the SMS message is screened by analyzing message text within the SMS message.

17. The non-transitory computer readable medium of claim 15, wherein the second node is configured to determine if the SMS message is allowed to be forwarded by determining if the originating subscriber associated with the SMS message is entitled to send the SMS message.

18. The non-transitory computer readable medium of claim 15, wherein the first node is further configured to screen the SMS message based on determining that monetary charges are associated with a destination address of the SMS message.

* * * * *